July 7, 1931.  C. L. SNYDER  1,813,326
SHIPPING DEVICE
Filed March 31, 1930
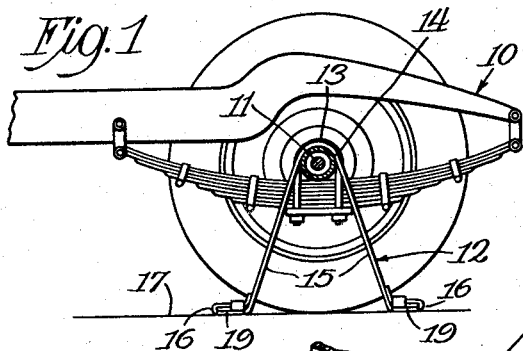
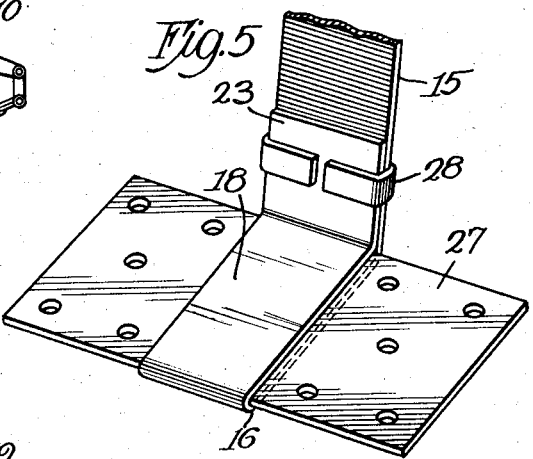
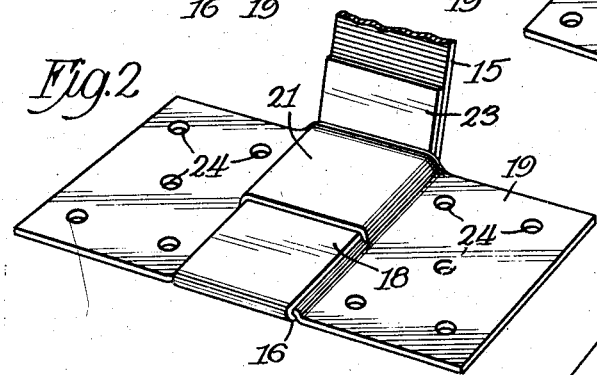
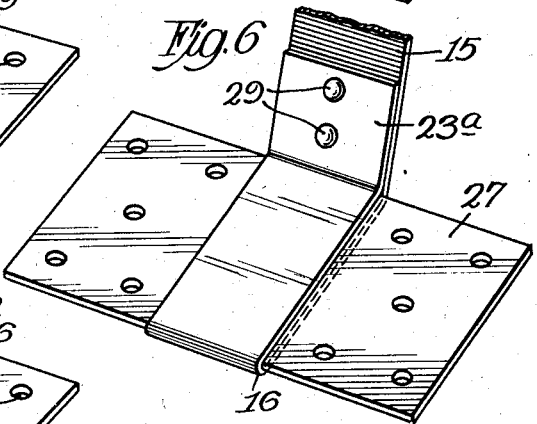
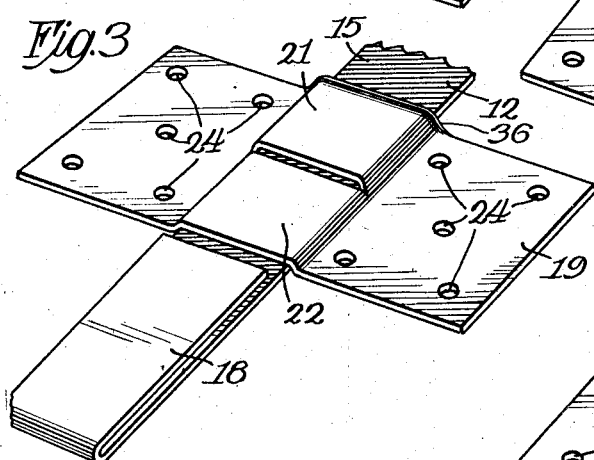
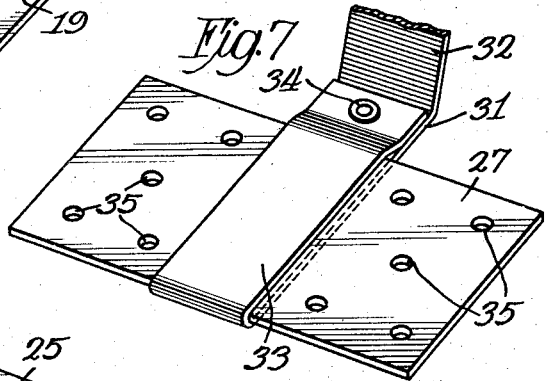
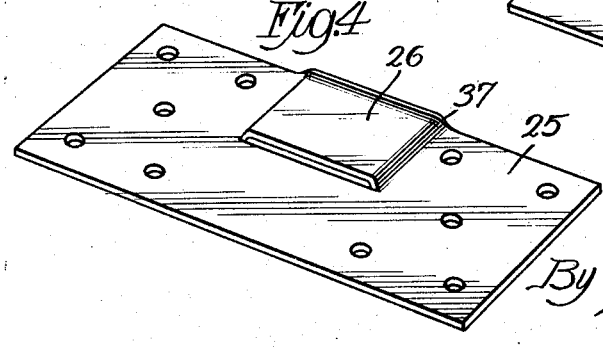
Inventor
Clifford L. Snyder
By Gillson, Mannheox Attys.

Patented July 7, 1931

1,813,326

UNITED STATES PATENT OFFICE

CLIFFORD L. SNYDER, OF DETROIT, MICHIGAN, ASSIGNOR TO EVANS PRODUCTS COMPANY, OF DETROIT, MICHIGAN, A CORPORATION OF DELAWARE

SHIPPING DEVICE

Application filed March 31, 1930. Serial No. 440,242.

This invention relates to holddown devices or devices for anchoring automobiles in freight cars and other shipping conveyances.

The principal object of the invention is the provision of a new and improved holddown or anchor device for securing an automobile during shipment, together with novel means for securing the foot plates to the feet of the holddown device.

Another object of the invention is the provision of a new and improved holddown or anchor device that is simple in construction, easily assembled, inexpensive to manufacture, and that is efficient in use.

Other and further objects and advantages of the invention will appear from the following description taken in connection with the accompanying drawings, in which Fig. 1 is a side elevation of the device showing the same applied to an automobile for holding the same in position during shipment;

Fig. 2 is a perspective view of the foot and foot plate;

Fig. 3 is a perspective view of the foot plate and showing an intermediate stage in the assembly of the foot and foot plate;

Fig. 4 is a perspective view of a modified form of foot from that shown in Figs. 1 to 3 inclusive;

Fig. 5 is a perspective view of a modified form of the foot and foot plate assembly;

Fig. 6 is a perspective view of a further modified form of foot and foot plate assembly; and Fig. 7 is a perspective view of a still further modified form of foot and foot plate assembly.

Referring now to the drawings, the reference character 10 designates an automobile having the axle 11 of the usual or any well known construction. Since the automobile constitutes no part of the present invention it is not thought necessary to further illustrate or describe the same, it being understood that four of the holddown devices are employed for each car, one for the end portion of each axle.

The anchoring device is shown generally at 12 and is preferably formed from a strip of sheet metal bent to form the loop 13 which is adapted to engage a portion of the vehicle, such as the axle, spring or chassis frame.

As shown in Fig. 1 the loop 13 engages the axle housing 14 and the ends of the strip are bent downwardly to form the legs 15 which are bent laterally to form the foot 16 which is adapted to extend along the floor 17 of the shipping conveyance, and to be attached thereto. The foot 16 has a return-bent portion 18 which is adapted to engage a foot plate 19 as will presently appear. The foot plate 19 extends transversely of the foot and is provided with a pair of offset loop portions 21 and 22. The loop portion 21 is offset a greater distance than the loop portion 22 for receiving the return-bent portion 18 of the foot. The portion 22 is sufficiently offset to receive the foot 16 so that the foot will be flush with the lower surface of the plate.

In assembling the foot plate on the foot 16 the ends of the strip forming the anchoring device 12 are first return-bent and the foot plate 19 is laid over the strip as shown in Fig. 3. The strip is then moved rearwardly, causing the extension 18 to pass beneath the loop portion 21, after which the strip is bent at an angle to the plate 19 to form the leg 15 as shown in Fig. 2. The return-bent portion 18 is made longer than the width of the plate so that the end 23 thereof will be bent laterally to the plate, thereby locking the parts in assembled relation and firmly anchoring the foot to the foot plate without the aid of other fastening means or the necessity of welding the parts together. The plate 19 is provided with apertures 24 through which nails or other fastening means may be inserted for attaching the plate to the floor 17.

The form of foot plate shown in Fig. 4 differs from that just described in that the plate 25 is provided with a single loop portion 26. The foot of the holddown device is adapted to extend beneath the plate and the return bent portion engages beneath the loop 26 as in the previous construction. In this form of the device the foot is not flush with the plate at its forward edge, as in the former construction.

In the form of construction shown in Fig. 5 a flat metal foot plate 27 is employed and the return-bent portion 18 of the foot 16 is bent as at 23 to extend parallel with the leg 15 exactly as in the form of construction shown in Fig. 2. The extension 23 is rigidly secured to the leg 15 by any suitable means, as by a clip 28 extending about the extension 23 and leg 15.

The form of construction shown in Fig. 6 differs from that shown in Fig. 5 in that the extension 23a is secured to the leg 15a by rivets 29 instead of by a clip 28.

The form of construction shown in Fig. 7 employs a plate 27, substantially the same as shown in Figs. 5 and 6. The foot portion 31 of the leg 32 is return-bent as at 33 and has its inner end secured to the foot 31 between the plate 27 and the leg 32 by any suitable means as by the rivet 34. If desired, the rivet 34 may be in the form of an eyelet as shown on the drawings, through which a nail may be driven if desired for assisting in holding the device to the floor of the car. The plate 27 is provided with the usual nail openings 35 for receiving fastening means as in the other constructions.

In the form of constructions shown in Figs. 1 to 4 inclusive, the loops 21 and 26 may have their inner edges rolled as shown at 36 and 37, respectively, as shown in Figs. 2 and 4. By means of this arrangement the metal is not so likely to tear at the junctures of the loop and plate as would otherwise be the case.

I claim as my invention:

1. A device for anchoring an automobile during shipment, comprising a comparatively narrow strip of sheet metal bent to form a loop at its intermediate portion for engaging a portion of a vehicle, the ends of said strip forming legs and being bent to form attaching feet, a foot plate for each attaching foot, said plates extending across said attaching feet, said plate having an upwardly extending loop, said foot having a return bent portion extending through said loop.

2. A device for anchoring an automobile during shipment, comprising a comparatively narrow strip of sheet metal bent to form a loop at its intermediate portion for engaging a portion of a vehicle, the ends of said strip forming legs and being bent to form attaching feet, a foot plate for each attaching foot, said plates extending across said attaching feet, said plate having an upwardly extending loop, said foot having a return bent portion extending through said loop and bent upwardly in contact with said leg.

3. A device for anchoring an automobile during shipment comprising a metallic strap bent to form a loop for engaging a part of an automobile, the ends of said strap being bent to form feet, a foot plate for each of said feet, said plates each having a pair of upwardly extending loops, said feet having a return bent portion extending over one of said loops and beneath the other.

4. A device for anchoring an automobile during shipment, comprising a comparatively narrow strip of sheet metal bent to form a loop at its intermediate portion for engaging a portion of a vehicle, the ends of said strip forming legs and being bent to form attaching feet, a foot plate for each attaching foot, said plates extending across said attaching feet, each of said feet having a return bent portion secured in engagement with the corresponding leg for holding said foot plates in assembled relation over said feet.

5. A hold-down device comprising a strip of material bent to form a loop for engaging a portion of a vehicle, and legs integral therewith, the lower end of each leg being bent to form a foot terminating in a return bent portion, a plate for said foot, said plate being positioned between said foot and return bent portion, means for attaching the plate to said foot and for anchoring the free end of said return bent portion without piercing said foot or said plate directly above said foot, said plate being provided with openings at each side of said foot for receiving fastening means.

In testimony whereof I affix my signature.

CLIFFORD L. SNYDER.